April 23, 1929. G. MUFFLY 1,709,865

PROCESS OF FORMING REFRIGERATOR ELEMENTS

Filed July 1, 1927 2 Sheets-Sheet 1

Inventor
Glenn Muffly
By
Irving Harness
Attorneys

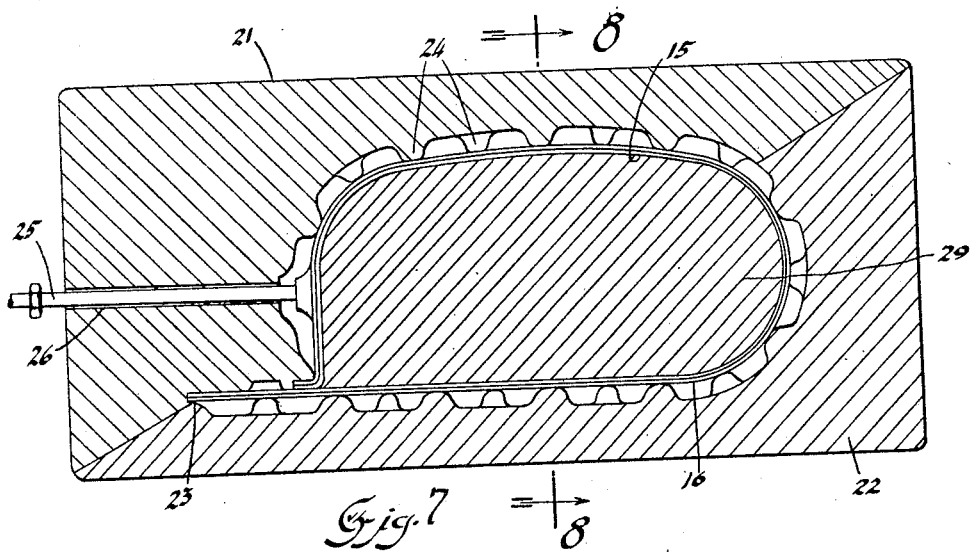
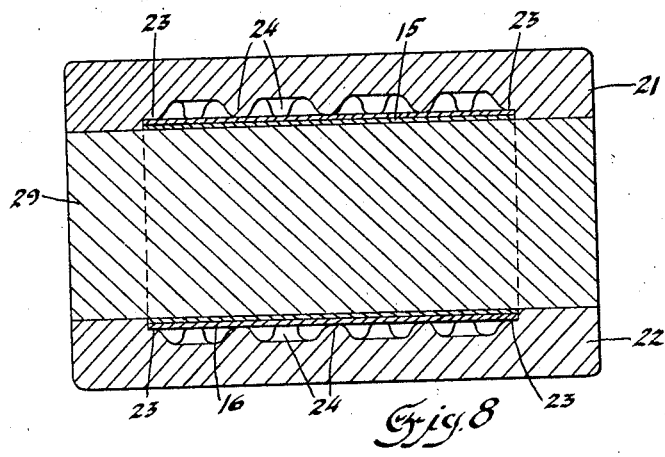
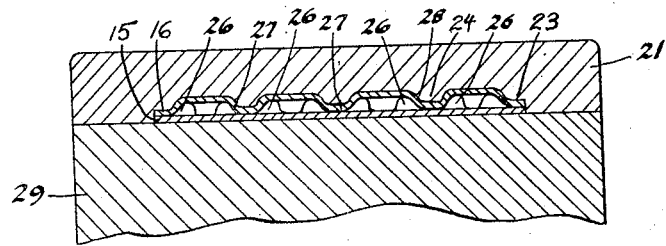

Patented Apr. 23, 1929.

1,709,865

UNITED STATES PATENT OFFICE.

GLENN MUFFLY, OF DETROIT, MICHIGAN, ASSIGNOR TO COPELAND PRODUCTS, INC., A CORPORATION OF MICHIGAN.

PROCESS OF FORMING REFRIGERATOR ELEMENTS.

Application filed July 1, 1927. Serial No. 202,789.

This invention relates to the process of forming chambers such as are used for the expansion chambers of refrigerating systems, and the principal object is to provide a simple and economical process of forming the same.

Another object is to provide a process of forming chambers from sheet metal, such chambers having a relatively large area of small depth and anchored against deformation at a plurality of points over the area thereof.

Another object is to provide a method of forming chambers from sheet metal comprising in securing a pair of matched sheet metal members together along their edges and holding the same together at a plurality of spaced points between their edges, introducing fluid under pressure between said plates whereby to separate the same at all points except the edges and the forementioned spaced points and thereafter securing said members together at said spaced points.

A further object is to provide a method for forming a chamber from sheet metal comprising in securing two flat sheet metal plates together in matching relationship by welding the same together along their edges, bending the sheets into a generally ring shaped form, placing the sheets within a die having a surface cooperating with the outer of the sheets and formed to provide portions in contact with the edges and with a plurality of spaced points intermediate the edges, the die also provided with a portion in contact with substantially the full area of the inner of the plates, introducing fluid under pressure between the plates whereby to expand the same at all points except the edges and the forementioned spaced points, and thereafter removing and welding the plates together at said spaced points.

The above being among the objects of the present invention the same consists in certain steps of operation to be hereinafter described with reference to the accompanying drawings, and then claimed, having the above and other objects in view.

In the accompanying drawings which illustrate a suitable embodiment in the present invention and in which like numerals refer to like parts throughout the several views,—

Fig. 7 is a sectional view taken longitudinally through a die constructed in accordance with the present invention in which the plates as formed in Fig. 6 are shown positioned.

Fig. 8 is a sectional view taken on the line 8—8 of Fig. 7.

Fig. 9 is a fragmentary sectional view taken on the line 8—8 Fig. 7, illustrating the form imparted to the plates after fluid pressure has been applied to the same.

The present invention deals with a process in forming chambers from sheet metal, and particularly to a process which is adaptable in forming chambers for refrigerating mechanisms wherein a maximum of heat exchange surface is provided with a maximum of strength and simplicity of formation.

In accordance with the present invention I secure together two sheets of substantially identical shape and contour by welding or otherwise securing the same together throughout their edges in substantially fully contacting relationship throughout their area, and thereafter holding the plates together in contacting relationship at a plurality of spaced points between the edges and then introducing fluid under sufficient pressure between the plates to cause the same to be separated at all points except the edges and the forementioned spaced points thereby forming a chamber between the plates, the points where the plates are secured together forming a maze for the passage of refrigerant between the plates, and at the same time presenting depressions in the surface of the plates effecting a greater area of heat transferring surface. Although I show in the accompanying drawing a refrigerator expansion chamber formed into a generally ring shaped section, it is to be understood that this process applies to any shape of chamber formed from the sheet metal in accordance with the present invention, the generally ring shaped section shown being illustrated because of the convenience with which it may be used in a refrigerating system. It will also be understood that the process is not limited to the formation of such chambers used exclusively in refrigerating systems, but the chambers formed in accordance with the present invention which may be employed for any use to which they may be found acceptable.

Figure 1:
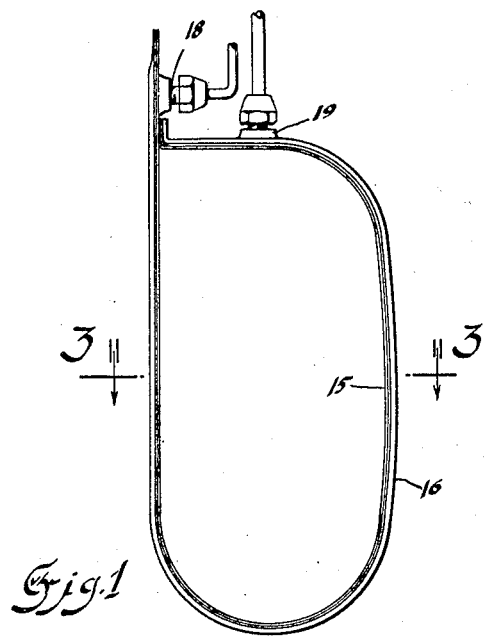
Fig. 1 is a side elevation of a completed expansion chamber for a refrigerating mechanism formed in accordance with the present invention.
Figure 2:
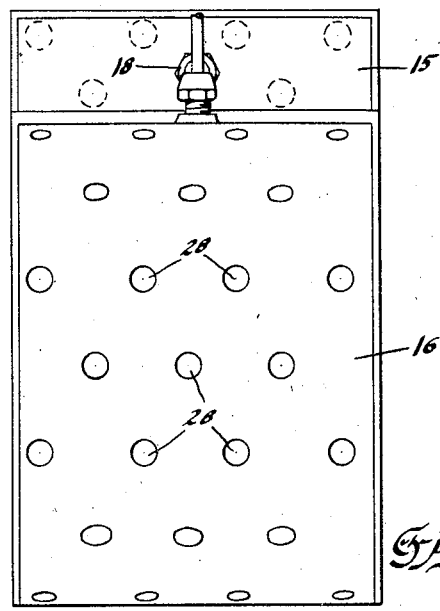
Fig. 2 is a side elevation of the expansion chamber shown in Fig. 1.
Figure 3:
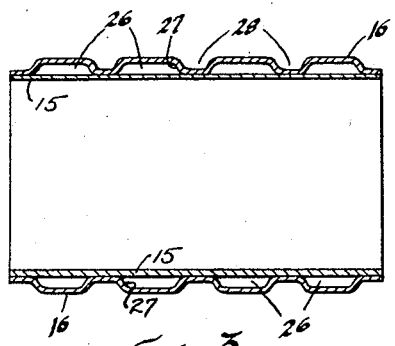
Fig. 3 is a sectional view taken on the line 3—3 Fig. 1.
Figure 4:
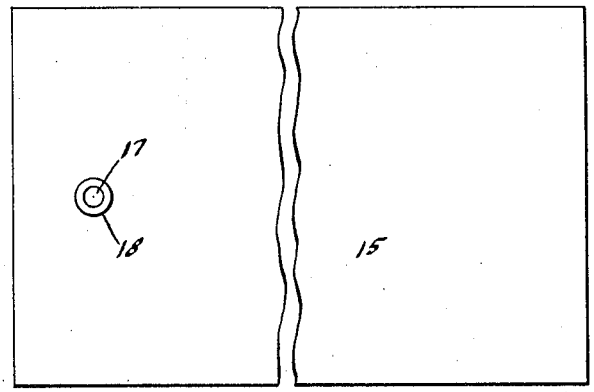
Fig. 4 is a plan view of the plates employed in the present invention superimposed and welded together along their edges.
Figure 5:
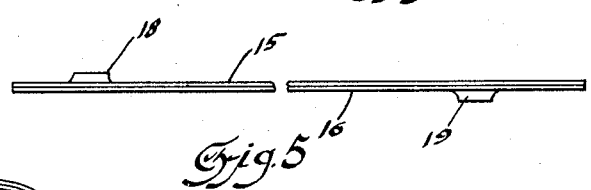
Fig. 5 is an edge view of the plates shown in Fig. 4.
Figure 6:
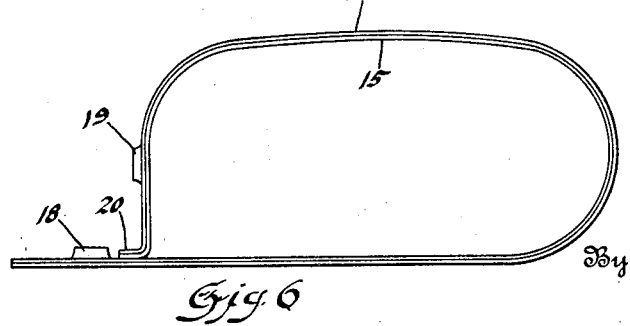
Fig. 6 is an edge view of the plates shown in Figs. 4 and 5, after they have been bent to a generally ring shaped section.

As an illustration of the use of the present invention in forming the refrigerator expansion chamber illustrated in Figs. 1, 2 and 3, I illustrate the first steps in Figs. 4 and 5. As shown the rectangular plates of flat sheet metal 15 and 16 are placed one over the other in contacting relationship. Each plate is provided with an opening such as 17 through the same adjacent one end, and each opening is preferably provided with a bossed portion such as 18 and 19, respectively, about the same. The plates 15 and 16 are placed together with the openings 17 at opposite ends from each other and with the bosses 18 and 19 on the sides opposite the contacting faces of plates. The plates are then secured together over the length of their entire edges so as to seal such edges. This may be done by welding, rolling the edges or by other means, but I have found that line welding by the electrical process is the most satisfactory, quickest and cheapest. After the plates have been secured together, as described, they are bent to the shape shown in Fig. 6, which for the purpose of illustration may be termed a generally ring shaped section, the right hand end of the plate, as viewed in the drawings being bent at right angles to the plane of such end to form a marginal flange such as 20 which is brought into contact with the outer face of the upper plate 15 immediately inwardly of the boss 18. The plates bent as indicated in Fig. 6, are then placed in a die of formation illustrated in Figs. 7, 8 and 9. This die comprises outer sections 21 and 22 and an inner section 29. The outer sections 21 and 22 are split diagonally of the plates in end view and are formed interiorly to provide portions 23 contacting against the entire edge portions of the plates 15 and 16 and other portions 24 contacting against the surface of the outer plate 16 at a plurality of points over the entire surface between the edges and spaced from the outer plate 16 at all other points over the surface of the outer plate 16. The inner section 29 is formed to the exact contour of the inner plate 15 and is received therein in contacting relationship with the entire surface thereof. The opening 17 in the boss 18 is plugged and the pipe 25 is inserted through an opening 26 in the die section 21 and threaded into the opening in the boss 19. Fluid under pressure, preferably hydraulic, is applied to the pipe 25 and is transmitted to between the plates 15 and 16 within the die, the pressure being sufficient to cause the outer plate 16 to be forced away from the inner plate 15 at all points over the surface thereof except at the portions 23 and 24 which hold the plates in contact at these points, the outer plate being expanded until limited by the walls of the die sections 21 and 22 intermediate the points 23 and 24. This causes a chamber 26 to be formed between the plates 15 and 16 which is interrupted by a plurality of projections 27 throughout its entire area. The portions 24 of the die sections 21 and 22 are preferably staggered in relationship to each other and separated sufficiently to allow free passage of the fluid past the projections 27, but so spaced that the projections 27 form a maze within the chamber 26 through which the fluid must pass in its path from one opening 17 to the other. In addition to forming such a maze for the passage of fluid through the chamber 26 the portions 24 of the die form depressions 28 in the face of the outer plate which increase the heat transferring surface of the same.

It will be apparent, of course, that the portions 24 of the die sections 21 and 22 must be formed with sufficient draft to allow the die sections 21 and 22 to be separated after the plate 16 has been expanded away from the plate 15. After the expansion is completed the pressure is relieved and the sections 21 and 22 separated and the section 29 withdrawn. The plates thus formed are then removed and are secured together at the bottom of each depression at which point they are in contact by spot-welding or the like, and the flange 20 is secured to the surface of plate 15. By securing the plates 15 and 16 together at the bottom of each depression 28 the structure is given the ability to withstand relatively high pressures within the chamber 26 without distortion, for if such intermediate points of securement between the edges were not provided, the pressure in the chamber 26 acting on the entire area of the plates 15 and 16, would tend to deform the plates and tear the edges apart.

It will be recognized that the specific order of steps here described are not all essential to the successful practice of this process, such as, for instance, the welding of plates 15 and 16 together before being bent into the generally ring shaped section shown in Fig. 6, but various modifications of the same may be worked out without departing from the invention involved, and formal changes may be made in the specific embodiment of the invention described without departing from the spirit and substance of the broad invention, the scope of which is commensurate with the appended claims.

What I claim is:

1. The method of forming chambers from sheet metal, comprising securing a pair of matching sheet metal members together along their edges, holding said members together in contacting relationship along their edges and at a plurality of spaced points between their edges, introducing fluid under pressure between said plates whereby to separate the same at all points except said edges and said spaced points, and thereafter securing said members together at said spaced points.

2. The method of forming an expansion chamber for refrigerating systems, comprising placing two sheets of metal one above the other in matching and contacting relationship, connecting said sheets together along their edges, enclosing said sheets in a die which clamps the edges of said sheets together one surface of said die being provided with a plurality of projections substantially contacting against one of said sheets, and then introducing fluid under pressure between said sheets whereby to separate the same at all points except said edges and at said projections.

3. The method of forming a chamber device, comprising securing two sheets of metal of substantially the same size together in matching and substantially contacting relationship by joining them along their edges, placing said joined sheets within a die which clamps the edges of said sheets together and which is provided with a surface cooperating with one of said sheets having certain portions thereof spaced from said sheet and other portions thereof substantially in contact with said sheets along the edges thereof and at a plurality of other spaced points, introducing fluid under pressure between said plates whereby to separate the same except along said edges and said spaced points, and then welding said sheets together at said spaced points.

4. The method of forming a chamber from sheet metal, comprising securing two flat sheet metal plates together in matching relationship by welding the same together along their edges, bending said sheets into a generally ring shaped form, placing said sheets within a die having a surface cooperating with the outer of said sheets formed to provide portions in contact with said edges and with a plurality of spaced points intermediate said edges, said die provided with a portion in contact with substantially the full area of the inner of said plates, introducing a fluid under pressure between said plates whereby to expand the same except at said edges and points, and thereafter removing and welding said plates together at said points.

5. The method of forming a chamber from sheet metal, comprising placing a pair of generally ring shaped sheet metal members, one telescoped within the other and secured together throughout their edges, within a die comprising a plurality of outer parts contacting against the outer of said members along the edges thereof and at a plurality of spaced points between the edges and an inner member contacting against the inner of said members, forcing fluid under pressure between said plates whereby to separate the same at substantially all points except said edges and said spaced points, removing said members from said die, and securing said members together at said spaced points.

6. The method of forming a chamber from sheet metal, comprising providing a pair of substantially equal sized plates, providing an opening through one of said plates, placing said plates in superimposed contacting relationship and welding them together along their edges, bending said plates into a substantially ring shaped section, placing said bent plates within a die comprising outer sections contacting against the edges of the outer of said plates and at a plurality of spaced points between the edges, and spaced from said outer plate at all other points, and an inner member contacting against the inner surface of the inner of said plates, connecting a pipe with said opening, forcing fluid under pressure through said pipe to separate said plates at all points except said edges and said spaced points, removing said plates from said die, and thereafter securing the ends of said plates relative to each other and spot-welding said plates together at said spaced points.

7. The method of forming a curved chamber device comprising in providing a pair of flat sheet metal plates, placing said plates in superposed and contacting relation, sealing the edges of one of said plates to the other of said plates, bending said plates to approximate the shape of the desired finished product, enclosing said bent plates between die members which clamp said sealed edges against the other of said plates and clamping said plates together at a plurality of spaced points between said edges, at least one of said die members being otherwise spaced from the adjacent of said plates, introducing fluid under pressure between said plates whereby to cause them to separate except at said edges and said points, and then removing said plates from said die members and welding them together at said points.

8. The method of forming a chamber device of non-planar shape, comprising in providing a pair of substantially contacting sheet metal members curved to approximate the shape of the desired finished product and sealed together throughout their edges, embedding said members in die parts acting to clamp said sealed edges together and provided with means for clamping said plates together between said edges at a plurality of spaced points, at least one of said die parts being spaced from the adjacent of said members at substantially all other points thereon, and thereafter introducing fluid under pressure between said members whereby to cause them to be separated at all points over their surface except at said edges and said spaced points.

GLENN MUFFLY.